United States Patent [15] 3,675,878
Von Beckh [45] July 11, 1972

[54] LIFE-SUPPORTING PRESSURIZABLE VEHICLES

[72] Inventor: Harald J. Von Beckh, P. O. Box 1220, Warminster, Pa. 18974

[22] Filed: Sept. 21, 1970

[21] Appl. No.: 74,056

[52] U.S. Cl. ........................................244/1 SS, 244/1 SC
[51] Int. Cl. ...............................................................B64c
[58] Field of Search ................244/1 SE, 1 SS, 1 R; 114/16 R

[56] References Cited

UNITED STATES PATENTS 3,386,685  6/1968  Judd .....................................244/1 SS Primary Examiner—Richard E. Aegerter
Attorney—R. S. Sciascia and Henry Hansen

[57] ABSTRACT

Spacecraft and aircraft life compartments suitable for protecting the occupants from accidental and sudden decompression during space or high altitude flight. The craft is divided into discrete compartment connected by hatchways which selectively close upon decompression in any one compartment in order to maintain pressure integrity in the other compartments. An air lock and lock valves between compartments enable emergency intravehicular escape and rescue from a decompressed compartment and ensure continued flight control pending corrective action.

13 Claims, 3 Drawing Figures

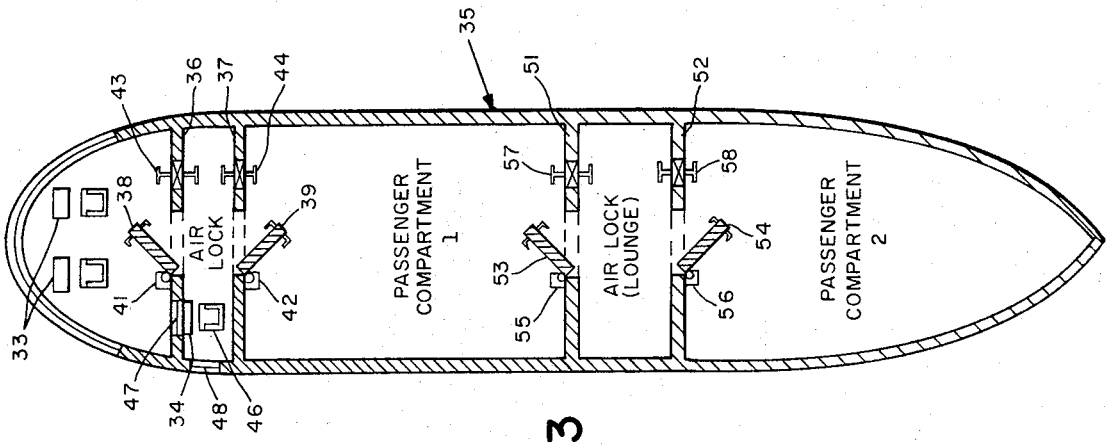
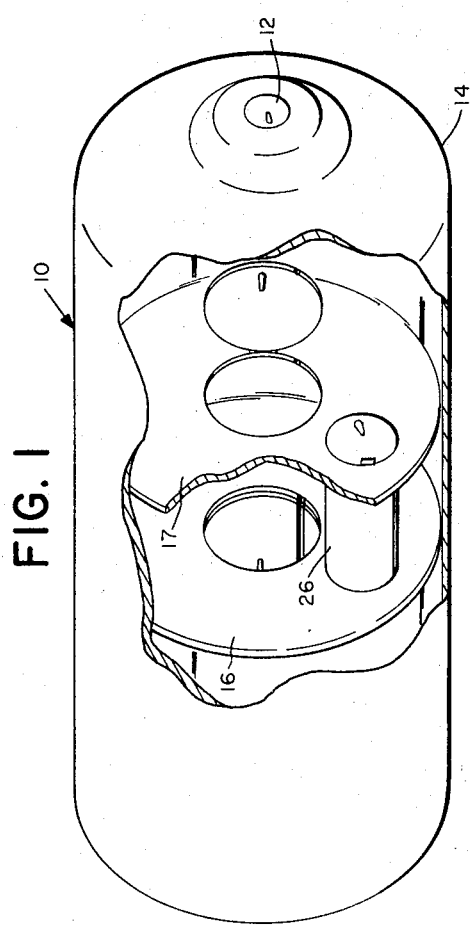
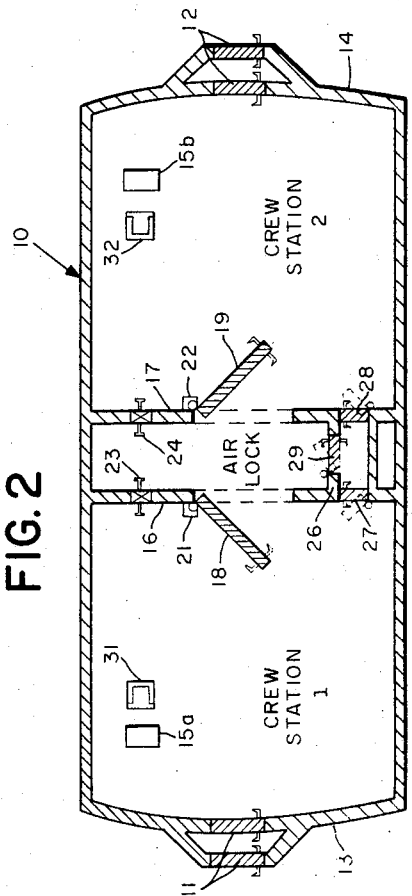
FIG. 1
FIG. 2
FIG. 3
INVENTOR.
HARALD J. VON BECKH
BY Henry Hansen
Atty.

3,675,878

LIFE-SUPPORTING PRESSURIZABLE VEHICLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to improvements in space and air vehicles and, more particularly, to such vehicles internally configured for the protection of occupants against accidental and sudden decompression.

Accidental decompression of a spacecraft or high altitude aircraft is a remote but nevertheless ever-present hazard. In a spacecraft, for example, this sudden decompression could be caused by capsule ruptures from excessive impact during docking or landing operations, or from collision with meteorites, space debris or other spacecraft.

Loss of pressure in life compartments is an event which requires immediate corrective action because the allowed time is extremely short. In the case of spacecraft, help from outside cannot be anticipated because, even if another spacecraft were in the immediate vicinity, docking maneuvers alone would exceed the allowable rescue time. In the case of a high altitude transport aircraft, it is imperative to descend in a minimum of time to an altitude which provides respirable atmospheres in order to protect those passengers who have not been able to don an oxygen mask.

Sudden decompressions result, inter alia, in acute hypoxia from lack of oxygen, external injuries from violent displacement of the occupant (especially when unrestrained) or from being struck by unsecured objects, internal injuries from the sudden expansion of free gases contained in the lungs and the gastrointestinal tract, and ebullism of body fluids which can occur whenever the ambient pressure is much lower than the vapor pressure of these fluids. Acute hypoxia, however, is the limiting factor in decompression exposures. If no protective action is taken, hypoxia alone will cause death before other factors such as ebullism or expansion of free gases would make survival impossible.

Two technical terms which are accepted in the aeromedical literature should be considered here: (1) the "time of useful consciousness," i.e. the period of time which elapses between the event of decompression and the point when the subject is no longer able to perform purposeful acts; (2) the "total rescue time," which is defined as the time period between the decompression event and the point when rescue by others can still be achieved without irreversible damage including death. Based upon experiments (Technical Report ARL–TR–70–4, Protective Measures Against Accidental Decompression in Space and Atmospheric Flight, March 1970, AD 705563, Defense Documentation Center, Cameron Station, Alexandria, Virginia 22315; Protection Against Accidental Decompression by Compartmentalization of Spacecraft and Aircraft, Aerospace Medicine, 41: 143–153, February 1970) with humans and chimpanzees it is assumed that in sudden decompressions to a near vacuum the time of useful consciousness is 12 seconds. Total rescue time has been established in chimpanzees as 3 minutes, i.e. if brought back into a respirable atmosphere before this time period has elapsed, the subjects survive without damage.

Extrapolating these findings to man, as safety minded value, a time period of not over 2½ minutes should be established for total rescue time. In synthesis, after sudden decompression of a spacecraft, occupants which are not protected by pressure suits would lose consciousness after approximately 12 seconds. This time period is obviously too short to don pressure suits. Therefore some other kind of protection is imperative.

SUMMARY OF THE INVENTION

Accordingly, it is a general purpose and object of the present invention to provide pressurized vehicle for space or high altitude flight which is capable of providing immediate intravehicular corrective and protective action in the event of accidental sudden decompression of the life compartments. Another object is to provide an aircraft or spacecraft which will enable flight crews to maintain flight control notwithstanding decompressed compartments within the vehicle.

Briefly, these and other objects of the invention are accomplished by an air or space vehicle which is divided into at least two discrete life compartments separated by an air lock. Hatches normally opening into either compartment from the air lock respectively close upon a sudden drop in air pressure in the air lock relative to the associated compartment. A normally closed tunnel through the air lock selectively provides alternative communication between the compartments if the air lock hatches are closed as in the event of decompression of the air lock.

BRIEF DESCRIPTION OF THE DRAWING

FIG. 1 represents a simplified angular view of a spacecraft constructed according to one embodiment of the invention with portions thereof cut away;

FIG. 2 represents a plan view of the inside of the spacecraft of FIG. 1; and

FIG. 3 represents a plan view of the inside of a high altitude aircraft fuselage constructed according to another embodiment of the invention.

DESCRIPTION OF THE PREFERRED EMBODIMENTS

Referring to FIGS. 1 and 2 there is shown one embodiment of the invention in the form of an orbital twin spacecraft 10 having end hatches 11 and 12 at respective ends 13 and 14 suitably configured for docking with other spacecraft and for transferring crewmen therethrough. Between ends 13 and 14 two bulkheads 16 and 17 divide spacecraft 10 into three severally pressurizable life compartments hereinafter identified as crew stations 1 and 2 at either end and an air lock therebetween. For reasons related hereinbelow, the volumes of stations 1 and 2 are significantly greater than of the air lock. It is contemplated that each crew station include separate and independent steering and control systems 15a and 15b, as well as life support systems, food and water supplies and other essential equipment not shown. It is also contemplated that the air lock be appropriately shielded by means not shown against radiation to serve as a shelter or so-called "storm cellar" for protecting the crew during periods of high radiation intensity (e.g. solar flares or Van Allen belt).

Bulkheads 16 and 17 include flapper-type lock hatches 18 and 19 opening respectively into crew stations 1 and 2 and are positioned normally open by detented hinges 21 and 22, respectively, to permit crewmembers free passage between stations 1 and 2 through the air lock. Although not illustrated, hatches 18 and 19 may also be of the sliding type in which case decompression responsive and power closing devices would be required to close them. For the flapper-type shown, the detented hinges 21 and 22 are set to permit hatches 18 and 19 to move to their closed positions upon sensing a predetermined closing force against either hatch such as produced by air rushing from either station into the air lock. Hatches 18 and 19 are self-latching so that they will remain closed notwithstanding cessation or reversal of the closing force, but may be manually reopened.

Two normally closed lock valves 23 and 24 respectively mounted in bulkheads 16 and 17 and operable from either sides thereof enable equalizing the pressures in adjacent compartments after corresponding lock hatch 18 or 19 closes. The occasion and sequence for pressure equalization is explained hereinbelow in describing operation of the invention.

It is also contemplated that the vehicle 10 include a pressure-tight tunnel 26 selectively communicating between stations 1 and 2 and the air lock by normally closed tunnel hatches 27, 28 and 29, respectively. The tunnel 26 is of sufficient size to allow transit of crewmen between stations in the event the air lock is decompressed and sealed from both stations 1 and 2, it permits access to the air lock for hyperbaric therapy to crewmen sickened by severe decompression, and affords access to the air lock by a space suit-wearing crewman for assessing or repairing structural defects or for recovery of another crewman accidentally caught in the air lock during a sudden decompression.

Operation of the above-described space vehicle will now be explained for several decompression events. For each of these events it is desirable that two so-called "duty" crewmen wear pressure suits at all times and each be restrained respectively in seats or couches 31 and 32 in stations 1 and 2. Other crewmen without pressure suits may move freely between stations.

Accidental decompression of crew station 1.

In the event of sudden decompression in station 1 such as caused by a rupture in the outside wall of station 1, lock hatch 19 immediately closes by the rush of air towards the rupture. The station 2 crewmen are therefore safe against decompression. But for the station 1 duty crewman, the station 1 crewmen immediately enter the air lock, the "duty" crewman assisting those who have been incapacitated by the decompression. Lock hatch 18 is then closed and lock valve 24 opened to equalize the pressure in the station 2 and the air lock. Due to the relatively small volume of the air lock, the resulting pressure in station 2 and the air lock immediately after equalization will be viable for all crewmen until the station 2 support system restores normal operating pressure. After pressure equalization, any station 1 crewmen suffering from severe decompression sickness can remain in the air lock while it is re-pressurized for hyperbaric therapy. Meanwhile, the station 1 duty crewman remains in station 1 to assess the cause of decompression and take appropriate corrective action. Crewmen of station 2 may don pressure suits, transit through the tunnel and assist duty crewman 1 in repair work.

Accidental decompression of crew station 2.

In this event, the same procedure as described for the accidental decompression of crew station 1 is employed mutatis mutandis.

Accidental decompression of the air lock.

In the more remote event of sudden decompression of the air lock, both lock hatches 18 and 19 immediately close by the inward rush of air. The crewmen of both stations are now separated from each other but for tunnel 26 whose hatches 27 and 28 may be opened to free transit of crewmen. A suit-wearing crewman may enter the decompressed air lock through tunnel 26 and hatch 29 in order to repair structural damage while maintaining pressure integrity in stations 1 and 2.

Controlled decompression.

In case of fire or accidental contamination of one station by noxious gases, it would be necessary for the crewmen to assemble in the other station and close both lock hatches. By means not shown, the contaminated station could be vented (i.e. decompressed) from the other station by remote controlled valves located in the end hatches or another site in the wall of the crew stations so that a suit-wearing crewman could reenter through tunnel 26 or the air lock to assess the damage and take appropriate action including recompression.

Applying the invention now to high altitude transport aircraft (Super Sonic Transports) it must be borne in mind that in these craft complete pressure equalization between passenger compartment and outside air could only occur when the structural damage is very extended. In this case, for aerodynamical reasons, the aircraft would be unable to fly and survival of occupants would be very remote.

In "survivable" decompressions, however, cabin altitude will never reach the altitude at which the decompression occurred because of the activation of additional compressor units, ram air devices and the emergency descent. The time of useful consciousness and total rescue time will therefore be significantly prolonged. However, since the emergency descent from cruising altitudes of 70,000 feet or more, takes considerable time (5–10 minutes) it must be expected that passengers who have not been able to don oxygen masks in time, will lose consciousness for several minutes. A division in two or more compartments, separated by air locks, would afford protection of passengers.

The maintenance of pilot efficiency of the flight crew deserves still more concern. It has been recommended that one of the two pilots should wear at all times a pressure suit in order to assure the immediate emergency descent, a suggestion which the pilots are — for understandable reasons — reluctant to accept. An air lock behind the crew compartment would assure pilot efficiency after decompression.

Referring now to FIG. 3, there is shown another embodiment of the invention as a fuselage 25 for such a high altitude transport aircraft. Two pairs of bulkheads 26 and 37, and 51 and 52, form from front to rear, a crew compartment, a first air lock, a passenger compartment 1, a second air lock, and a passenger compartment 2. The crew compartment includes conventional flight controls 33 and an emergency life support system (not shown) and the first air lock includes emergency flight controls 34. Front and side windows 47 and 48 in the air lock at flight controls 34 provide a restricted field of view for a crewman seated at the emergency flight controls 34. The second air lock may serve secondarily as a lounge. Bulkheads 36 and 37 include lock hatches 38 and 39 positioned by detent hinges 41 and 42, and pressure-equalizing lock valves 43 and 44; and bulkheads 51 and 52 include lock hatches 53 and 54, detent hinges 55 and 56 and lock valves 57 and 58, which all operate in the same manner described above for like elements in the spacecraft 10.

Operation of the above-described aircraft is similar to that described for spacecraft 10.

Accidental decompression of crew compartment.

In the event of decompression of the crew compartment, lock hatch 39 closes immediately by the rush of air towards the latter. The crewmen enter the air lock. Hatch 38 is closed and lock valve 44 opened to equalize the pressure between the passenger compartment 1 and the air lock. Pilot functions (emergency descent) could then be continued at the emergency flight controls 34 until lower altitudes with a respirable atmosphere are reached.

Accidental decompression of passenger compartment.

In the event of decompression of passenger compartment 1, lock hatches 38 and 54 close and both crewmen commence an emergency descent of the aircraft to a respirable altitude. Sudden decompression of passenger compartment 2, of course, will close hatch 53 and similar action by the crew would be executed.

Some of the many advantages and useful features of the invention should now be readily apparent. For example, a pressurizable vehicle is provided which significantly reduces the hazard to crew and passengers of accidental decompression during high altitude, atmospheric or space flight. It provides procedures for intravehicular self-rescue or rescue by others within the very short time period before unconsciousness or irreversible injury occurs. In case of fire, it enables evacuation of affected areas of the vehicle and extinction of the fire as well as decontamination or purging of toxic gases. The invention is particularly suitable for use in future supersonic transport aircraft which are required to fly at very high altitudes and pressurized cabins as it ensures the continued proficiency of the crew to maneuver the aircraft to lower and respirable altitudes.

It will be understood, of course, that various changes in the details, materials, steps and arrangement of parts which have been herein disclosed and illustrated in order to explain the nature of the invention may be made by those skilled in the art without departing from the principle and scope of the invention as expressed in the appended claims.

What is claimed is:

1. A pressurizable vehicle for supporting life in the event of decompression, comprising:
   container means sealable for maintaining pressure integrity therein relative to ambient pressure;
   first and second bulkheads secured within said container forming thereby two discrete life compartments and an air lock interposed therebetween, each bulkhead having an opening communicating between the adjacent one of said life compartments and said air lock;
   first and second hatches operatively connected respectively to said first and second bulkheads at said openings; and
   first and second detent means operatively connected respectively to said first bulkhead and hatch and to said second bulkhead and hatch for maintaining said hatches normally open and for closing either in response to decompression in said air lock relative to the adjacent one of said life compartments.

2. A vehicle according to claim 1, further comprising:
   first and second normally closed lock valves mounted respectively in said first and second bulkheads and operable from either sides thereof for establishing communication therethrough.

3. A vehicle according to claim 2, further comprising:
   first and second control means mounted respectively in one of said life compartments and the other of said life compartments or said air lock for separately and independently controlling vehicle flight.

4. A vehicle according to claim 3, further comprising:
   said first and second control means mounted in respective ones of said life compartments for separately and independently controlling vehicle flight.

5. A vehicle according to claim 4, further comprising:
   said bulkheads having opposed openings therethrough;
   passage means in said air lock connected between said openings and sealable for maintaining pressure integrity therein relative to said lock; and
   third and fourth hatches operatively connected respectively to said first and second bulkheads at opposed openings, said third and fourth hatches being normally closed.

6. A vehicle according to claim 5, further comprising:
   said passage means having an opening intermediate the ends thereof; and
   fifth hatch operatively connected to said passage means at said intermediate opening, said fifth hatch being closed.

7. A vehicle according to claim 3, further comprising:
   first and second control means mounted respectively in one of the life compartments and said air lock for separately and independently controlling vehicle flight.

8. A vehicle according to claim 7, further comprising:
   third and fourth bulkhead means secured within said container forming thereby first and second chambers within one of said compartments and another air lock interposed therebetween, each bulkhead having an opening therethrough;
   third and fourth hatch means operatively connected respectively to said third and fourth bulkheads at said openings; and
   third and fourth detent means operatively connected respectively to said first bulkhead and hatch and said second bulkhead and hatch for maintaining said hatches normally open and for closing either in response to decompression in said other air lock relative to the adjacent one of said chambers.

9. A vehicle according to claim 8, further comprising:
   third and fourth lock valves mounted respectively in said third and fourth bulkheads and operable from either side thereof for establishing communication therethrough.

10. A vehicle according to claim 1, further comprising:
    said first and second hatches hinged at one side and normally opening into either of said compartments.

11. A pressurizable vehicle for supporting life in the event of decompression, comprising:
    container means sealable for maintaining pressure integrity therein relative to ambient pressure;
    bulkhead means secured within said container forming thereby a life compartment and an air lock, said bulkhead means having an opening communicating between said compartment and said air lock;
    hatch means operatively connected to said bulkhead means at said opening; and
    detent means operatively connected to said bulkhead means and hatch means for maintaining said hatch means normally open and for closing said hatch means in response to decompression in said air lock relative to said life compartment.

12. A vehicle according to claim 1, further comprising:
    a normally closed lock valve mounted in said container means and operable from said air lock for establishing communication with a source of pressure.

13. A vehicle according to claim 2, further comprising:
    first and second control means mounted respectively in said life compartment and said air lock for separately and independently controlling vehicle flight.

* * * * *